US010146401B2

(12) United States Patent
Miura

(10) Patent No.: US 10,146,401 B2
(45) Date of Patent: Dec. 4, 2018

(54) ELECTRONIC DEVICE, CONTROL METHOD, AND CONTROL PROGRAM

(71) Applicant: KYOCERA Corporation, Kyoto-shi, Kyoto (JP)

(72) Inventor: Saya Miura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 557 days.

(21) Appl. No.: 14/433,496

(22) PCT Filed: Oct. 4, 2013

(86) PCT No.: PCT/JP2013/077157
§ 371 (c)(1),
(2) Date: Apr. 3, 2015

(87) PCT Pub. No.: WO2014/054801
PCT Pub. Date: Apr. 10, 2014

(65) Prior Publication Data
US 2015/0277701 A1    Oct. 1, 2015

(30) Foreign Application Priority Data

Oct. 5, 2012  (JP) .................................. 2012-223540

(51) Int. Cl.
*G06F 3/048*  (2013.01)
*G06F 3/0481* (2013.01)
(Continued)

(52) U.S. Cl.
CPC ........ *G06F 3/04817* (2013.01); *G06F 3/0482* (2013.01); *G06F 3/0488* (2013.01); *G06F 3/04842* (2013.01); *G06F 3/04883* (2013.01); *H04M 1/72586* (2013.01); *H04M 2250/22* (2013.01)

(58) Field of Classification Search
CPC ........................ G06F 3/04818; G06F 3/04842
See application file for complete search history.

(56) References Cited

U.S. PATENT DOCUMENTS

2010/0295789 A1\* 11/2010 Shin ...................... G06F 1/1626
345/168
2011/0161853 A1\* 6/2011 Park ...................... G06F 3/0486
715/769

(Continued)

FOREIGN PATENT DOCUMENTS

WO    2008/086302 A1    7/2008

OTHER PUBLICATIONS

International Search Report dated Jan. 7, 2014 in corresponding International Application No. PCT/JP2013/077157.

(Continued)

*Primary Examiner* — Jeanette J Parker
(74) *Attorney, Agent, or Firm* — Hauptman Ham, LLP

(57) ABSTRACT

According to one of aspects, an electronic device includes a display and a controller. The display displays a first screen including a plurality of icons each corresponding to an application. When detecting a screen-adding operation for adding a new screen while an icon of the plurality of icons is selected in response to a selecting operation performed on the first screen, the controller creates a second screen including the selected icon.

8 Claims, 10 Drawing Sheets

(51) Int. Cl.
*G06F 3/0488* (2013.01)
*G06F 3/0484* (2013.01)
*G06F 3/0482* (2013.01)
*H04M 1/725* (2006.01)

(56) References Cited

U.S. PATENT DOCUMENTS

| | | | | |
|---|---|---|---|---|
| 2011/0167387 A1* | 7/2011 | Stallings | ............. | G06F 3/04883 715/826 |
| 2011/0252346 A1* | 10/2011 | Chaudhri | ............ | G06F 3/04817 715/765 |
| 2012/0030628 A1* | 2/2012 | Lee | ................ | G06F 3/0486 715/835 |
| 2012/0304084 A1* | 11/2012 | Kim | ................ | G06F 3/0486 715/762 |
| 2013/0321340 A1* | 12/2013 | Seo | ................ | G06F 1/1641 345/174 |
| 2015/0143272 A1* | 5/2015 | Wu | ................ | G06F 3/04817 715/765 |

OTHER PUBLICATIONS

Shigeru Matsuyama, Teiban Soft Jiyu Jizai 1, Mac Fan, May 1, 2012 (May 1, 2012), vol. 20, No. 5, pp. 158 to 165.

\* cited by examiner

ELECTRONIC DEVICE, CONTROL METHOD, AND CONTROL PROGRAM

CROSS-REFERENCE TO RELATED APPLICATION

This application is a National Stage of PCT international application Ser. No. PCT/JP2013/077157 filed on Oct. 4, 2013 which designates the United States, incorporated herein by reference, and which is based upon and claims the benefit of priority from Japanese Patent Application No. 2012-223540 filed on Oct. 5, 2012, the entire contents of which are incorporated herein by reference.

FIELD

The present application relates to an electronic device, a control method, and a control program.

BACKGROUND

Touchscreen devices with a touchscreen are known. Examples of such touch screen devices include, but are not limited to, smartphones and tablets. Such a touchscreen device detects a gesture of a finger, a pen, or a stylus pen via the touchscreen. The touchscreen device then operates in accordance with the detected gesture. Examples of operations executed in accordance with a detected gesture are disclosed in Patent Literature 1.

An operating system (OS) installed on the device implements basic operations of the touchscreen device. Examples of the OS installed on the touchscreen device include, but are not limited to, Android (registered trademark), BlackBerry (registered trademark) OS, iOS, Symbian (registered trademark) OS, and Windows (registered trademark) Phone.

CITATION LIST

Patent Literature

Patent Literature 1: PCT Publication No. WO 2008/086302

Technical Problem

Some touchscreen devices display an icon corresponding to an application on the screen, and run the application corresponding to the icon when an operation on the icon is detected. A touchscreen configured in such a manner, however, will have a larger number of icons as the number of available applications is increased, and the management of the icons may become troublesome for users. For such a reason, there is a need for an electronic device, a control method, and a control program capable of improving the ease-of-use related to the icon management.

SUMMARY

According to one of aspects, an electronic device includes a display and a controller. The display displays a first screen including a plurality of icons each corresponding to an application. When detecting a screen-adding operation for adding a new screen while an icon of the plurality of icons is selected in response to a selecting operation performed on the first screen, the controller creates a second screen including the selected icon.

According to one of aspects, a control method for an electronic device with a display includes: displaying a first screen including a plurality of icons each corresponding to an application; selecting an icon of the plurality of icons in response to a selecting operation performed on the first screen; and creating a second screen including the selected icon when a screen-adding operation for adding a new screen is detected.

According to one of aspects, a control program causes an electronic device with a display to execute: displaying a first screen including a plurality of icons each corresponding to an application; selecting an icon of the plurality of icons in response to a selecting operation performed on the first screen; and creating a second screen including the selected icon when a screen-adding operation for adding a new screen is detected.

DESCRIPTION OF EMBODIMENTS

Embodiments for implementing the present invention will now be explained in detail with reference to some drawings. In the explanation below, as one of examples of an electronic device, a smartphone will be used.

Embodiments

Figure 1:
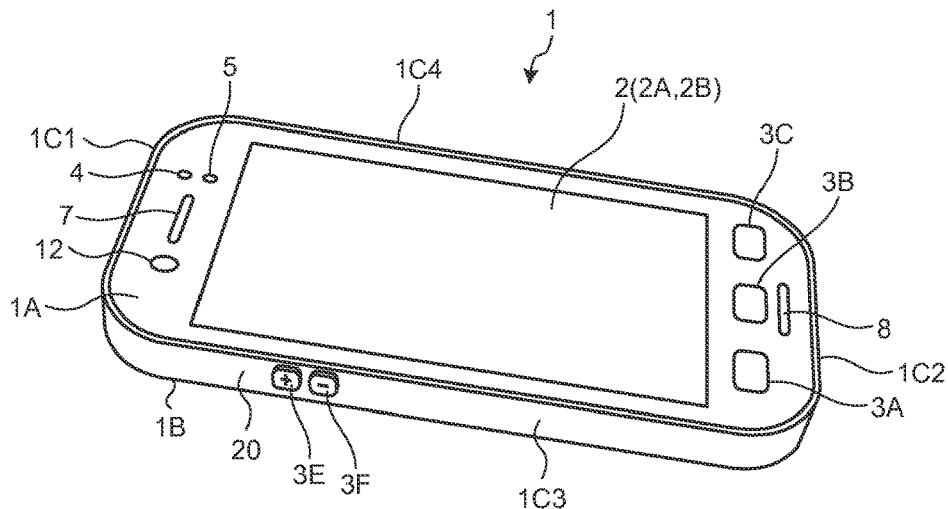
FIG. 1 is a perspective view of a smartphone according to one of embodiments.
Figure 2:
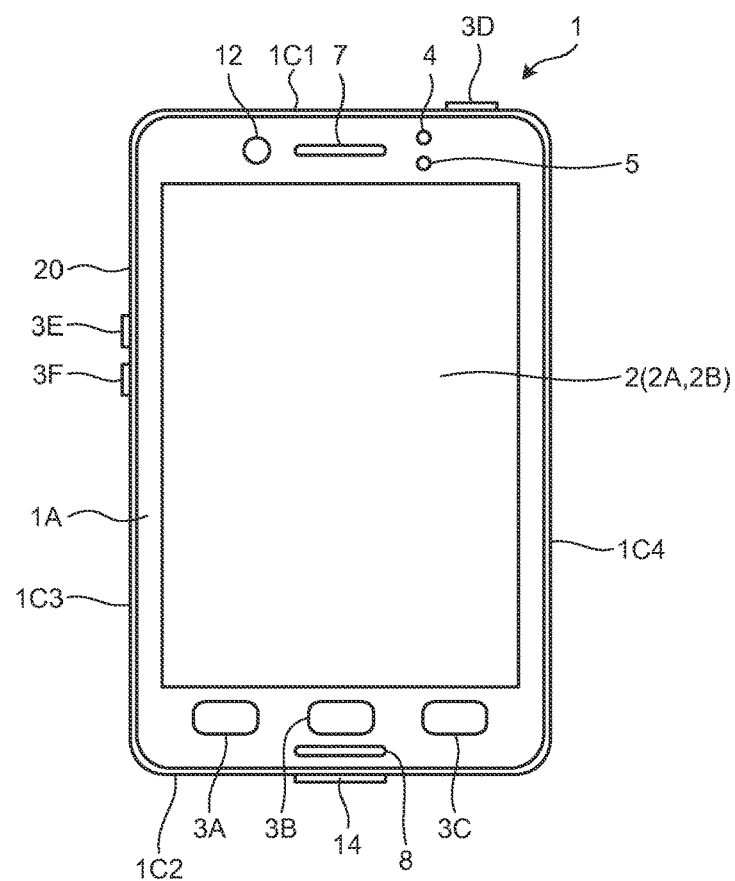
FIG. 2 is a front view of the smartphone.
Figure 3:
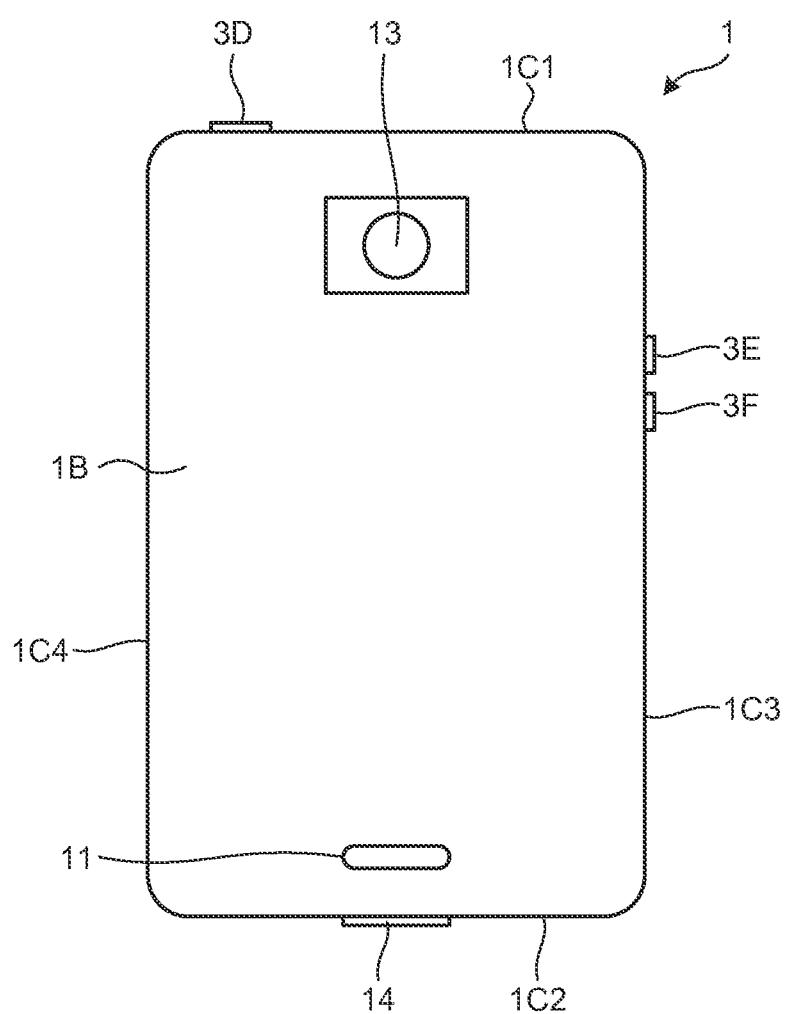
FIG. 3 is a rear view of the smartphone.

The overall configuration of this smartphone 1 according to one of embodiments will now be explained with reference to FIGS. 1 to 3. As illustrated in FIGS. 1 to 3, the smartphone 1 has a housing 20. The housing 20 has a front face 1A, a back face 1B, and side faces 1C1 to 1C4. The front face 1A is a front surface of the housing 20. The back face 1B is a rear surface of the housing 20. The side faces 1C1 to 1C4 are side surfaces that connect the front face 1A to the back face 1B. Hereinafter, the side faces 1C1 to 1C4 may be generally referred to as a side face 1C, without specifying which one of the side surfaces the side face 1C is.

The smartphone 1 includes a touch screen display 2, buttons 3A to 3C, an illuminance sensor 4, a proximity sensor 5, a receiver 7, a microphone 8, and a camera 12 that are positioned on the front face 1A. The smartphone 1 includes a speaker 11 and a camera 13 positioned on the back face 1B. The smartphone 1 also includes buttons 3D to 3F and a connector 14 on the side faces 1C. Hereinafter, the buttons 3A to 3F may be generally referred to as a button 3, without specifying which one of the buttons 3A to 3F the button 3 is.

The touch screen display 2 includes a display 2A and a touch screen 2B. In an example illustrated in FIG. 1, the display 2A and the touch screen 2B both have a substantial rectangular shape, but the shapes of the display 2A and the touch screen 2B are not limited to a rectangle. The display 2A and the touch screen 2B may be any shape, including a square or a circle. In an example illustrated in FIG. 1, the display 2A and the touch screen 2B are laid in an overlapping manner, but the arrangement of the display 2A and the touch screen 2B is not limited thereto. The display 2A and the touch screen 2B may be arranged side by side, or separated from each other, for example. In an example illustrated in FIG. 1, the long sides of the display 2A extend along the long sides of the touch screen 2B, and the short sides of the display 2A extend along the short sides of the touch screen 2B, but how the display 2A and the touch screen 2B are laid in an overlapping manner is not limited thereto. In a configuration in which the display 2A and the touch screen 2B are laid in an overlapping manner, one or more sides of the display 2A may not extend along any side of the touch screen 2B, for example.

The display 2A is provided with a display device such as a liquid crystal display (LCD), an organic electro-luminescence display (GELD), or an inorganic electro-luminescence display (IELD). The display 2A displays characters, images, symbols, figures, and the like.

The touch screen 2B detects contact of a finger, a pen, a stylus pen, or the like with the touch screen 2B. The touch screen 2B is capable of detecting the positions of the contact of a plurality of fingers, pens, stylus pens, or the like with the touch screen 2B. In the description hereunder, a finger, a pen, a stylus pen, or the like contacting with the touch screen 2B is sometimes referred to as a "contacting object".

Any technology such as capacitive sensing, resistive sensing, surface acoustic wave (SAW) (or ultrasonic) sensing, infrared sensing, electromagnetic induction sensing, and load sensing, may be used to allow the touch screen 2B to detect contact. To simplify the explanation, in the description below, it is supposed that the user will operate the smartphone 1 by touching the touch screen 2B with a finger.

The smartphone 1 determines the type of a gesture based on at least one of contact detected by the touch screen 2B, the position at which the contact is detected, a change in the position at which the contact is detected, the interval at which the contact is detected, and the number of times the contact is detected. A gesture is an operation performed on the touch screen 2B. Examples of the gesture the type of which is determined by the smartphone 1 include, but are not limited to, a touch, a long touch, a release, a swipe, a tap, a double-tap, a long tap, a drag, a flick, a pinch-in, and a pinch-out.

A "touch" is a gesture of touching the touch screen 2B with a finger. The smartphone 1 determines a gesture of touching the touch screen 2B with a finger as a touch. A "long touch" is a gesture of touching the touch screen 2B with a finger for a longer time than a certain period of time. The smartphone 1 determines a gesture of touching the touch screen 2B with a finger for a longer time than a certain period of time as a long touch.

A "release" is a gesture of lifting a finger from the touch screen 2B. The smartphone 1 determines a gesture of lifting a finger from the touch screen 2B as a release. A "swipe" is a gesture of moving a finger across the touch screen 2B while keeping the finger in contact with the touch screen 2B. The smartphone 1 determines a gesture of moving a finger across the touch screen 2B while keeping the finger in contact with the touch screen 2B as a swipe.

A "tap" is a gesture of making a touch and release in succession. The smartphone 1 determines a gesture of making a touch and release in succession as a tap. A "double-tap" is a gesture of making a touch-and-release twice in succession. The smartphone 1 determines a gesture of making a touch-and-release twice in succession as a double-tap.

A "long tap" is a gesture of making a long touch and release in succession. The smartphone 1 determines a gesture of making a long touch and release in succession as a long tap. A "drag" is a gesture of making a swipe starting from an area containing a displayed movable object. The smartphone 1 determines a gesture of making a swipe starting from a region containing a displayed movable object as a drag.

A "flick" is a gesture of touching the touch screen 2B and sliding the finger away from the touch screen 2B. In other words, a "flick" is a gesture of making a touch and release with the finger moving away from the screen. The smartphone 1 determines a gesture of touching the touch screen 2B and releasing the finger while moving the finger away from the touch screen 2B as a flick. A flick is often performed while the finger is moved in one direction. A flick includes a "flick-up" in which the finger is moved upwardly in the screen, a "flick-down" in which the finger is moved downwardly in the screen, a "flick-to-right" in which the finger is moved to the right in the screen, and a "flick-to-left" in which the finger is moved to the left in the screen. In a flick, a finger is often moved quicker than in a swipe.

A "pinch-in" is a gesture of swiping a plurality of fingers in directions approaching to one another. The smartphone 1 determines a gesture of moving fingers in directions reducing the distance between the positions of one finger and another finger(s) detected by the touch screen 2B as a pinch-in. A "pinch-out" is a gesture of swiping a plurality of fingers in directions away from to one another. The smartphone 1 determines a gesture of moving fingers in directions extending the distance between the positions of one finger and another finger(s) detected by the touch screen 2B as a pinch-out.

In the explanation below, a gesture performed with one finger is sometimes referred to as a "single touch gesture", and a gesture made with two or more fingers is sometimes referred to as a "multi-touch gesture". Examples of a multi-touch gesture include a pinch-in and a pinch-out. A tap, a flick, and a swipe, for example, are single touch gestures, if such gestures made with one finger, and are multi-touch gestures if they are made with two or more fingers.

The smartphone 1 operates in response to such gestures which is determined via the touch screen 2B so that intuitive and easy-to-use operability for users can be achieved. The smartphone 1 may perform different operations in response to the same gesture depending on a screen displayed on the display 2A. Hereinafter, the operation of the touch screen 2B detecting a contact and the smartphone 1 determining the type of a gesture as "X" based on the detected contact is sometimes simply described as an operation of "the smartphone 1 detecting X", or of "the controller detecting X", in order to simplify the description.

Figure 4:
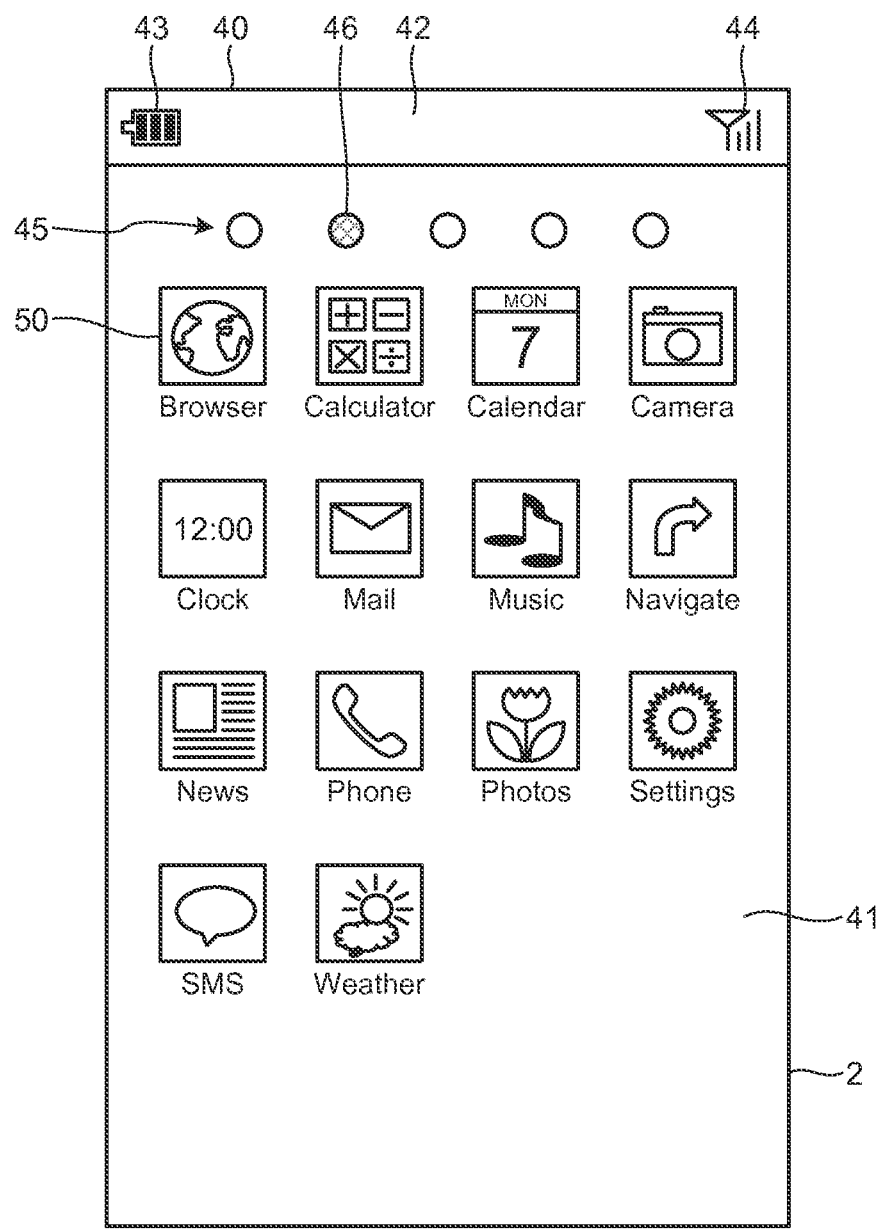
FIG. 4 is a schematic illustrating one of examples of a home screen.

One of examples of a screen displayed on the display 2A will now be explained with reference to FIG. 4. FIG. 4 illustrates one of examples of a home screen. A home screen is sometimes referred to as a desktop, a standby screen, an idle screen, or a standard screen. The home screen is displayed on the display 2A. The home screen is a screen allowing a user to select which one of the applications installed in the smartphone 1 is to be executed. The smartphone 1 executes the application selected on the home screen in the foreground. A screen of the application executed in the foreground is displayed on the display 2A.

Icons may be arranged on the home screen of the smartphone 1. A plurality of icons 50 are arranged on the home screen 40 illustrated in FIG. 4. Each of the icons 50 is mapped in advance to the corresponding application installed in the smartphone 1. When the smartphone 1 detects a gesture on an icon 50, the smartphone 1 executes the application corresponding to the icon 50 on which the gesture is detected. For example, when the smartphone 1 detects a tap on the icon 50 corresponding to an e-mail application, the smartphone 1 executes the e-mail application.

The icon 50 includes an image and a character string. The icon 50 may include a symbol or a figure instead of an image. The icon 50 may not include one of an image or a character string. The icons 50 are arranged based on a layout pattern. A wall paper 41 is displayed on the background of the icons 50. A wall paper is sometimes referred to as a photo screen, a back screen, an idle image, or a background image. The smartphone 1 may use any image as the wall paper 41. The smartphone 1 may allow a user to select an image to be displayed as the wall paper 41.

The smartphone 1 may have a plurality of home screens. The smartphone 1 determines the number of home screens based on a setting provided by a user, for example. Although the home screen may be provided in plurality, the smartphone 1 displays selected one of the home screens on the display 2A.

The smartphone 1 displays an indicator (locator) 45 in the home screen 40. The indicator 45 includes one or more symbols 46. The number of symbols 46 matches the number of the home screens 40. The indicator 45 indicates the position of the home screen 40 currently being displayed. The symbol 46 corresponding to the home screen 40 currently being displayed is represented differently from those corresponding to the other home screens 40.

In an example illustrated in FIG. 4, the indicator 45 has five symbols 46. This means that there are five home screens 40. These five symbols 46 are positioned in a row, from the left to the right across the screen. In an example illustrated in FIG. 4, the second symbol 46 from the left is represented differently from the other symbols 46. This means that the second home screen 40 from the left is currently displayed.

The smartphone 1 is capable of changing the home screen displayed on the display 2A. When a gesture (screen switching operation) is detected while one of the home screens is displayed, the smartphone 1 changes the home screen displayed on the display 2A to another home screen. For example, when detecting a flick-to-right, the smartphone 1 changes the home screen displayed on the display 2A to an adjacent home screen on the left side thereof. As another example, when detecting a flick-to-left, the smartphone 1 changes the home screen displayed on the display 2A to an adjacent home screen on the right side thereof. When a gesture is detected while a first home screen is displayed on the display 2A, the smartphone 1 changes the home screen displayed on the display 2A from the first home screen to a second home screen in such a manner that the first home screen displayed on the display 2A becomes gradually smaller and the second home screen displayed on the display 2A becomes gradually larger. Alternatively, the smartphone 1 may swap the home screens in such a manner that the first home screen is immediately replaced with the second home screen.

An area 42 is provided at the upper end of the display 2A. The area 42 has a remaining battery indicator 43 indicating the amount of remaining battery, and a signal level indicator 44 indicating the strength of the electric field of the electric waves used in the communication. The smartphone 1 may also display the time of the day, weather, an active application, a type of the communication system, calling status, device mode, and events occurred in the device in the area 42. In this manner, the area 42 is used for providing various notifications to the user. The area 42 may also be provided to a screen other than the home screen 40. The position where the area 42 is provided is not limited to the upper end of the display 2A.

Figure 5:
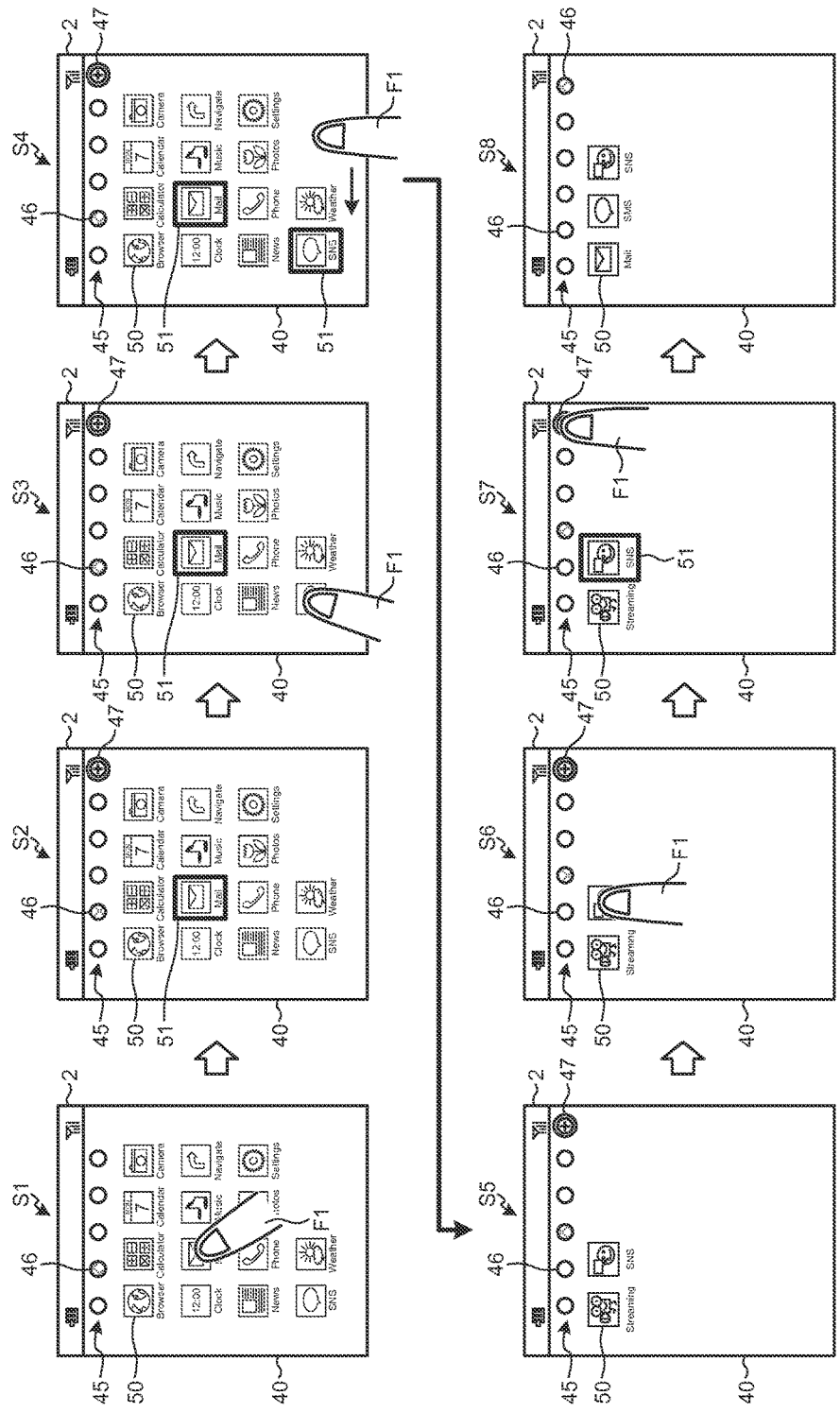
FIG. 5 is a schematic for explaining how a home screen is added.

The smartphone 1 is enabled to add a home screen 40 in response to a user operation. FIG. 5 is a schematic for explaining how a home screen 40 is added. At Step S1, the smartphone 1 displays the home screen 40 illustrated in FIG. 4 on the touchscreen display 2. At Step S1, the user's finger F1 long-touches a "Mail" icon 50.

When the smartphone 1 detects the long touch on the "Mail" icon 50, the smartphone 1 represents the "Mail" icon 50 as selected. The smartphone 1 displays the selected icon 50 in a manner different from the icons 50 not selected. For example, the smartphone 1 adds a frame 51 to the selected icon 50, as illustrated at Step S2. The smartphone 1 may represent the selected icon 50 in any manner different from the icons 50 that are not selected, e.g., in a different color or luminosity.

When there is at least one selected icon 50 in the smartphone 1, the home screen 40 is transited to an icon-selected mode. In the icon-selected mode, the smartphone 1 displays an Add button 47, as illustrated at Step S2. When detecting a tap (screen-adding operation) on the Add button 47, the smartphone 1 creates a new home screen 40.

If a tap (selecting operation) on the icon 50 is detected in the icon-selected mode, the smartphone 1 selects and unselects the icon 50 alternatingly, instead of executing the application corresponding to the icon 50. At Step S3, the user's finger F1 taps on an "SMS" icon 50. Because the "SMS" icon 50 having not been selected is tapped in the icon-selected mode, the smartphone 1 represents the "SMS" icon 50 as selected at Step S4. At this time, the "Mail" icon 50 having been already selected remains selected. In other words, the smartphone 1 is configured to allow a plurality of icons 50 to be represented as selected.

At Step S4, the user's finger F1 flicks to the left on the home screen 40. When detecting a left flick (screen switching operation) on the home screen 40, the smartphone 1 switches a screen to be displayed to an adjacent home screen 40 on the right. At Step S5, the screen to be displayed is switched to the right adjacent home screen 40. Therefore, the home screen 40 has different icons 50 from those arranged at Steps S1 to S4. In the indicator 45, the third symbol 46 from the left is represented in a different form from the other symbols 46.

In this manner, the smartphone 1 switches the home screen 40 to be displayed even in the icon-selected mode, when detecting a screen switching operation. Even after the smartphone 1 switches the home screen 40 to be displayed, the icons 50 being selected remain selected. Therefore, at Step S5, the "Mail" icon 50 and the "SMS" icon 50 having been selected before the home screen 40 is switched remain selected, although these icons are not visible on the touchscreen display 2.

At Step S6, the user's finger F1 taps on a "SNS" icon 50 on the switched home screen 40. Because the "SNS" icon 50 having not been selected is tapped in the icon-selected mode, the smartphone 1 selects the "SNS" icon 50 at Step S7.

At Step S7, the user's finger F1 taps on the Add button 47. When detecting the tap (screen-adding operation) on the Add button 47, the smartphone 1 creates a new home screen 40, and arranges the selected icons 50 on the created home screen 40. The smartphone 1 then displays the created home screen 40, and exits the icon-selected mode.

At Step S8, the new home screen 40 is displayed on the touchscreen display 2. The number of symbols 46 included in the indicator 45 is now increased to six, and the symbol 46 at the right end is represented in a different form from the other symbols 46. The "Mail" icon 50 selected at Step S2, the "SMS" icon 50 selected at Step S4, and the "SNS" icon 50 selected at Step S7 are arranged on the new home screen 40.

When a new home screen 40 is created, the smartphone 1 may delete the selected icons 50 from the original home screen 40, or may leave the selected icons 50 on the original home screen 40. Whether or not the selected icon 50 is deleted from the original home screen 40 may be determined based on predefined settings or a user's operation.

When deletion of the selected icon is determined based on a user's operation, a first selected mode in which the selected icons 50 is deleted from the original home screen 40 and a second selected mode in which the selected icons 50 is not deleted from the original home screen 40 may be provided. In such a case, the status of the icons 50 may be changed according to the number of times the operation has been performed. For example, to select the first selected mode, tap the icon 50 once; to select the second selected mode, tap the icon 50 once again; and to set non-selection mode, tap the icon 50 once again. Alternatively, the icon 50 may be changed depending on the type of the operation. For example, to set the first selected mode, tap the icon 50; and to set the second selected mode, long-tap the icon 50.

An objective of creating a new home screen to arrange icons thereon can be achieved by a process of first creating a home screen without any icon and moving or copying icons one by one from an existing home screen to the created home screen. This process, however, requires operations of switching home screens and moving or copying icons across the home screens many times. These operations could be sometimes troublesome.

In the scheme illustrated in FIG. 5 according to an embodiment, a user can create a new home screen and arrange desired icons thereon with a smaller number of operations by displaying the home screens including icons to be moved or copied to select the icons and by performing the screen-adding operation. That is, an embodiment can improve ease-of-use related to icon management.

The home screens 40 are exemplarily illustrated in FIG. 4 and FIG. 5, and the forms and the arrangement of various elements, the number of the home screens 40, and various types of operations performed on the home screen 40 need not be the same as those described herein.

Figure 6:
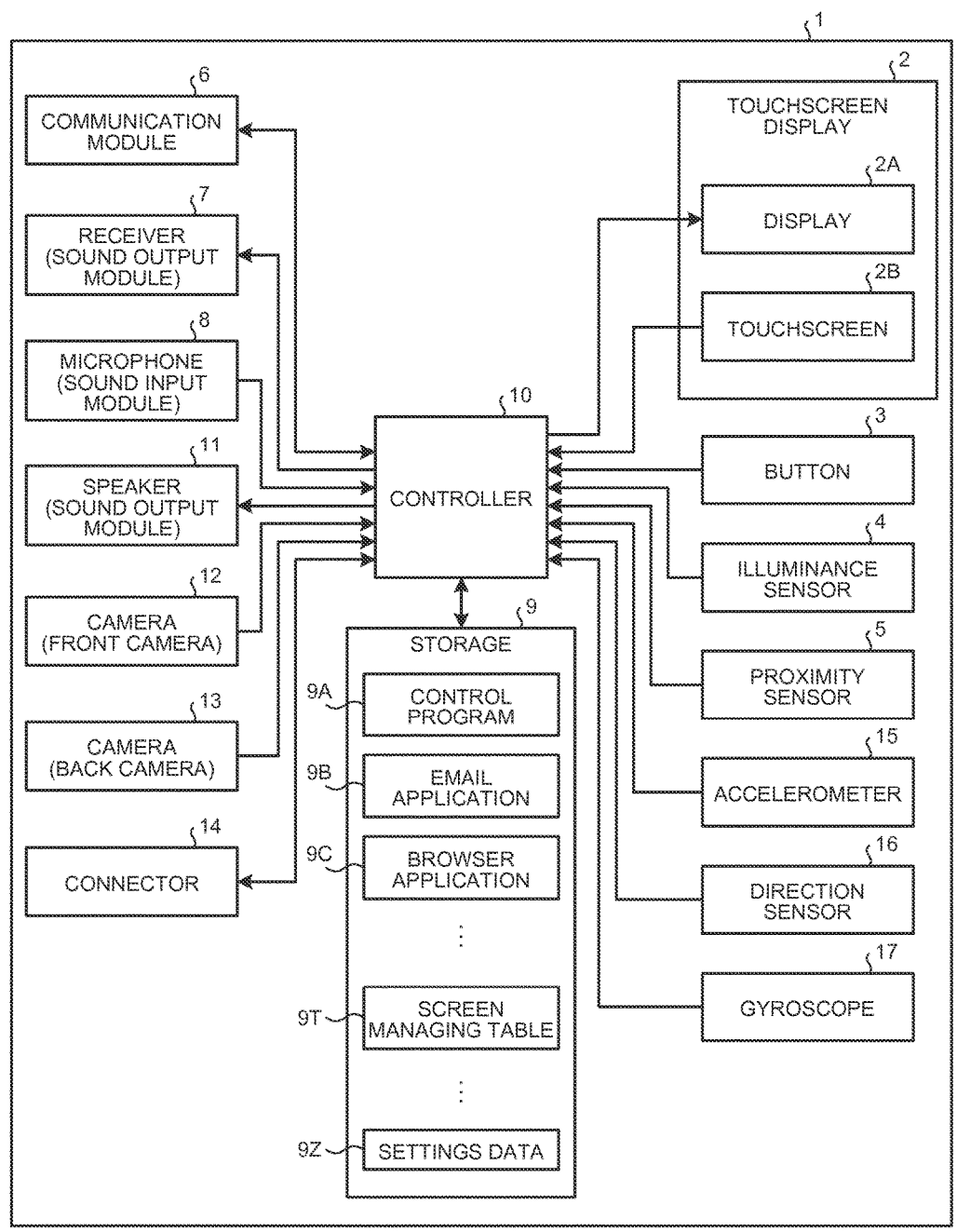
FIG. 6 is a block diagram of the smartphone.

FIG. 6 is a block diagram of the smartphone 1. The smartphone 1 includes the touch screen display 2, the buttons 3, the illuminance sensor 4, the proximity sensor 5, a communication module 6, the receiver 7, the microphone 8, a storage 9, a controller 10, the speaker 11, the cameras 12 and 13, the connector 14, an accelerometer 15, a direction sensor 16, and a gyroscope 17.

The touchscreen display 2 includes the display 2A and the touchscreen 2B, as mentioned above. The display 2A displays characters, images, symbols, and figures, and the like. The touchscreen 2B detects contacts. The controller 10 detects gestures on the smartphone 1. Specifically, the controller 10 detects operation (gesture) performed on the touchscreen 2B (touchscreen display 2) in cooperation with the touchscreen 2B.

The buttons 3 are operated by a user. The buttons 3 include the buttons 3A to 3F. The controller 10 detects an operation performed on the button 3 in cooperation with the button 3. Examples of the operations performed on the button 3 include, but are not limited to, a click, a double click, a triple click, a push, and a multi-push.

The buttons 3A to 3C are, for example, "Home" button, "Back" button, and "Menu" button, respectively. The button 3D is a power-on/off button for the smartphone 1, for example. The button 3D may also function as a sleep/wake-from-sleep button. The buttons 3E and 3F are volume buttons, for example.

The illuminance sensor 4 detects the illuminance of the ambient light around the smartphone 1. Illuminance represents a light intensity, brightness, or luminance. The illuminance sensor 4 is used in adjusting the luminance of the display 2A, for example. The proximity sensor 5 detects the presence of a nearby object in a non-contact fashion. The proximity sensor 5 detects the presence of an object based on a change in the magnetic field, or based on a change in the return time of an ultrasonic reflection wave, for example. The proximity sensor 5 detects a face approaching the touch screen display 2, for example. The illuminance sensor 4 and the proximity sensor 5 may be configured as one sensor. The illuminance sensor 4 may be used as a proximity sensor.

The communication module 6 performs communication wirelessly. The communication technologies supported by the communication module 6 use wireless communication standards. Examples of such wireless communication standards include cellular phone communication standards such as 2G, 3G, and 4G. Examples of the cellular phone communication standards include Long Term Evolution (LTE), Wideband Code Division Multiple Access (W-CDMA), Code Division Multiple Access (CDMA) 2000, Personal Digital Cellular (PDC), Global System for Mobile Communications (GSM) (registered trademark), and Personal Handy-phone System (PHS). Other examples of the wireless communication standards include Worldwide Interoperability for Microwave Access (WiMAX), IEEE 802.11, Bluetooth (registered trademark), Infrared Data Association (IrDA), Near Field Communication (NFC), etc. The communication module 6 may support one or more of the communication standards listed above.

The receiver 7 and the speaker 11 are sound output modules. The receiver 7 and the speaker 11 output sound signals received from the controller 10 as a sound. The receiver 7 is used to output the voice of a person on the other side of the telephone, for example. The speaker 11 is used to output a ringtone or a piece of music, for example. One of the receiver 7 and the speaker 11 may provide the function of the other. The microphone 8 is a sound input module. The microphone 8 converts the voice of a user or the like into sound signals, and transmits the signals to the controller 10.

The storage 9 stores therein computer programs and data. The storage 9 is also used as a working area temporarily storing therein results of processes executed by the controller 10. The storage 9 may include any non-transitory storage medium such as a semiconductor storage medium and a magnetic storage medium. The storage 9 may also include a plurality of types of storage media. The storage 9 may also include a combination of a portable storage medium such as a memory card, an optical disc, or a magneto-optical disk, and a reader for the storage medium. The storage 9 may also include a storage device to be used as a temporary storage area such as a random access memory (RAM).

The computer programs stored in the storage 9 include applications that are executed in the foreground or in the background, and control programs that support the operations of the applications. An application causes the display 2A to display a screen, and causes the controller 10 to execute a process corresponding to a gesture detected via the touch screen 2B, for example. One of examples of the control programs is an OS. Such applications and control programs may be installed in the storage 9 via wireless communication established by the communication module 6, or via a non-transitory storage medium.

The storage 9 stores therein, for example, a control program 9A, an email application 9B, a browser application 9C, a screen managing table 9T, and settings data 9Z. The email application 9B provides an email function for, for example, composing, transmitting, receiving, and displaying an email. The browser application 9C provides a Web browser function for displaying a Web page. The screen managing table 9T is data for managing screens displayed and the objects such as icons displayed on each of the screens. The settings data 9Z includes information related to various settings related to the operations of the smartphone 1.

The control program 9A provides a function related to various types of control for causing the smartphone 1 to operate. For example, the control program 9A enables telephone conversations by controlling the communication module 6, the receiver 7, and the microphone 8. The functions provided by the control program 9A include functions for performing various types of control such as creating a screen based on a gesture detected on the touchscreen 2B, and arranging objects such as icons arranged on another screen to the new screen, for example. The functions provided by the control program 9A may be used in combination with the functions provided by other computer programs such as the email application 9B.

The controller 10 is a processor. Examples of the processor include, but are not limited to, a central processing unit (CPU), a system-on-a-chip (SoC), a micro control unit (MCU), and a field-programmable gate array (FPGA). The controller 10 implements various functions by integrally controlling the operation of the smartphone 1.

Specifically, the controller 10 executes instructions included in the computer programs stored in the storage 9 while referring to the data stored in the storage 9 as required. The controller 10 then implements various functions by controlling functional modules based on the data and the instructions. Examples of the functional modules include, but are not limited to, the display 2A, the communication module 6, the receiver 7, and the speaker 11. The controller 10 may change the control based on the detection results of detecting modules. Examples of the detecting modules include, but are not limited to, the touch screen 2B, the buttons 3, the illuminance sensor 4, the proximity sensor 5, the microphone 8, the camera 12, the camera 13, the accelerometer 15, the direction sensor 16, and the gyroscope 17.

The controller 10 performs various types of control such as changing the information displayed on the display 2A based on a gesture detected on the touchscreen 2B, by executing the control program 9A, for example.

The camera 12 is a front camera for capturing an image of an object facing the front face 1A. The camera 13 is a back camera for capturing an image of an object facing the back face 1B.

The connector 14 is a connector terminal to which another device is connected. The connector 14 may be a general terminal such as a universal serial bus (USB), High-Definition Multimedia Interface (HDMI) (registered trademark), Light Peak (Thunderbolt (registered trademark)), or an earphone and microphone connector. The connector 14 may also be a special terminal such as a Dock connector. Examples of the devices connected to the connector 14 include, but are not limited to, an external storage, a speaker, and a communication device.

The accelerometer 15 detects the direction and the magnitude of the acceleration working on the smartphone 1. The direction sensor 16 detects the direction of geomagnetism. The gyroscope 17 detects an angle and an angular velocity of the smartphone 1. The detection results of the accelerometer 15, the direction sensor 16, and the gyroscope 17 are used in combination to detect a change in the position and the attitude of the smartphone 1.

Some or all of the computer programs and the data stored in the storage 9 in FIG. 6 may be downloaded from another device over wireless communication established by the communication module 6. Some or all of the computer programs and the data stored in the storage 9 in FIG. 6 may be stored in a non-transitory storage medium readable by a reader included in the storage 9. Some or all of the computer programs and the data stored in the storage 9 in FIG. 6 may be stored in a non-transitory storage medium readable by a reader connected to the connector 14. Examples of the non-transitory storage medium include, but are not limited to, a compact disc, (CD) (registered trademark), a digital versatile disc (DVD) (registered trademark), an optical disk such as a Blu-ray (registered trademark), a magneto-optical disk, an magnetic storage medium, a memory card, and a solid-state storage medium.

The configuration of the smartphone 1 illustrated in FIG. 6 is exemplary, and may be modified as appropriate to the extent that the gist of the present invention is not impaired. For example, the number and the type of the buttons 3 are not limited to an example illustrated in FIG. 6. As the buttons for making operations related to the screen, the smartphone 1 may be provided with buttons in the arrangement of a numeric key pad or in a QWERTY layout, instead of the buttons 3A to 3C. The smartphone 1 may be provided with only one button for making operations related to the screen, or may be provided with no button. In an example illustrated in FIG. 6, the smartphone 1 is provided with two cameras, but the smartphone 1 may be provided with only one camera, or may be provided with no camera. In an example illustrated in FIG. 6, the smartphone 1 is provided with the three types of sensors for detecting the position and the attitude, but the smartphone 1 may not have some of these sensors, or may have other types of sensors for detecting at least one of the position and the attitude.

Explained now with reference to FIGS. 7 to 10 is another example in which the smartphone 1 creates a new screen, and icons arranged on another screen are included in the new screen. The smartphone 1 displays a launcher screen on the touchscreen display 2 in response to a certain operation. The launcher screen is a screen specialized for execution of applications. The launcher screen therefore may not have a function unrelated to the execution of the applications, unlike the home screen 40, for example, such a function for displaying a wall paper on the background.

Figure 7:
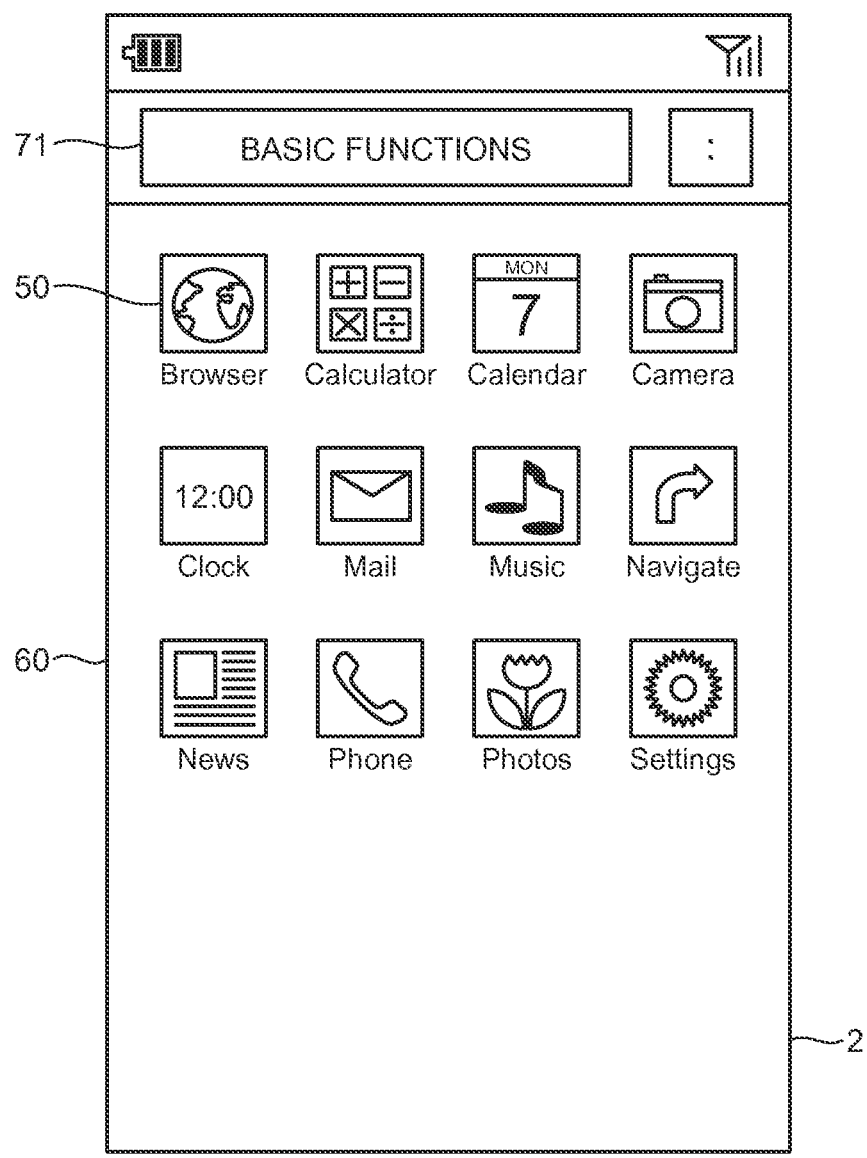
FIG. 7 is a schematic illustrating one of examples of a launcher screen.

FIG. 7 is a schematic illustrating one of examples of the launcher screen. The launcher screen 60 illustrated in FIG. 7 has an arrangement of a plurality of icons 50. The icons 50 are the same as those arranged on the home screen 40. In other words, the icons 50 are mapped to the respective specific applications installed on the smartphone 1.

The launcher screen 60 has a title area 71 in the upper end. The title area 71 is an area where the title assigned to the launcher screen 60 is displayed. The smartphone 1 is configured to be capable of having a plurality of launcher screens 60 that are displayed in a switching manner in response to a screen switching operation. The smartphone 1 is configured to enable a user to assign a title to each of the launcher screens 60 so that the user can identify the corresponding launcher screen 60. The title area 71 displays the title assigned to the launcher screen 60 currently being displayed.

A first screen switching operation for switching the launcher screen 60 is, for example, a flick operation. For example, when detecting a flick-to-left on the launcher screen 60, the smartphone 1 displays the next launcher screen 60 in a predetermined sequence, and, when detecting a flick-to-right on the launcher screen 60, the smartphone 1 displays the previous launcher screen 60.

A second screen switching operation is an operation for causing the touchscreen display 2 to display a title list screen 70 and selecting the title corresponding to a desired launcher screen 60 from the displayed list of titles. When detecting a long tap on the title area 71 in the launcher screen 60, for example, the smartphone 1 displays the title list screen 70.

Figure 8:
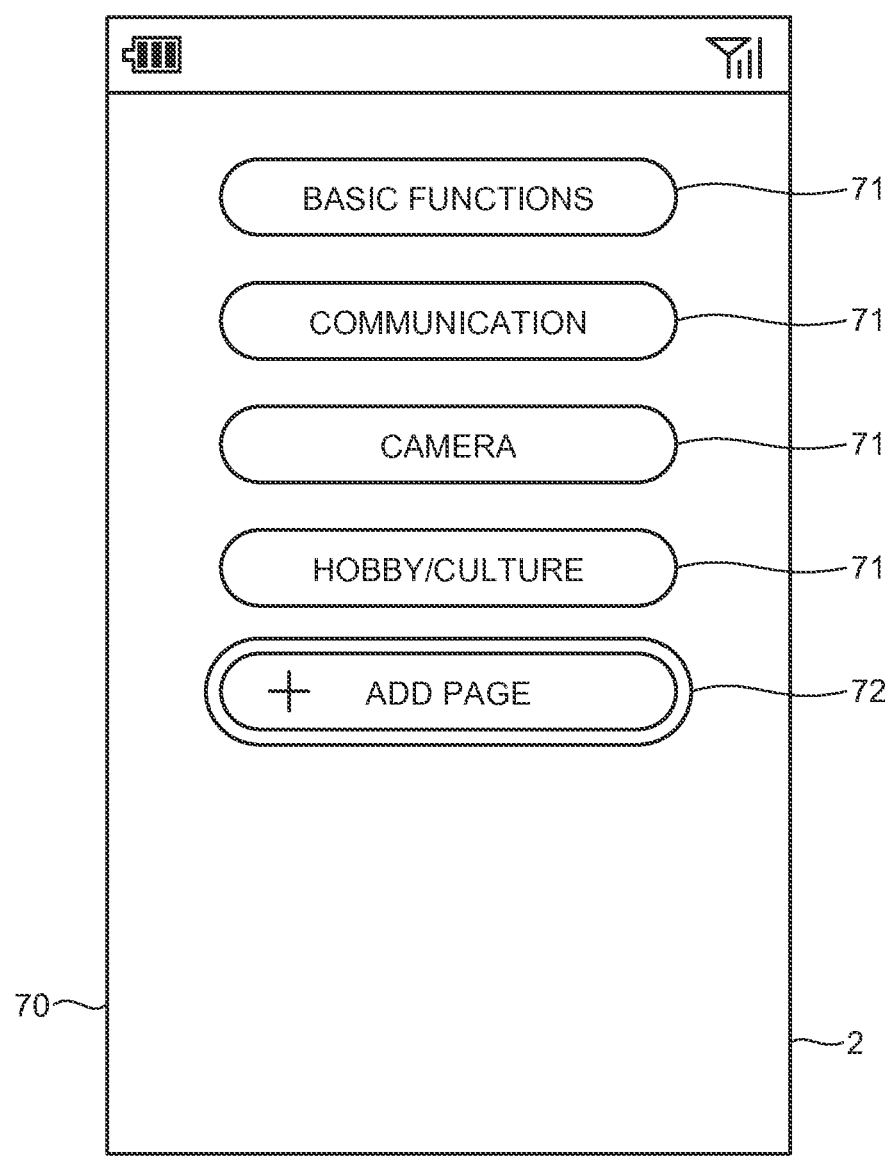
FIG. 8 is a schematic illustrating one of examples of a title list screen.

FIG. 8 is a schematic illustrating one of examples of the title list screen 70. The title list screen 70 illustrated in FIG. 8 includes four title areas 71 specified with titles "Basic Functions", "Communication", "Camera", and "Hobby/Culture", respectively. This indicates that the smartphone 1 has four launcher screens 60. When one of the title areas 71 is tapped, the smartphone 1 displays the launcher screen 60 corresponding to the tapped title area 71 on the touchscreen display 2. The second screen switching operation allows a user to display a desired launcher screen 60 on the touchscreen display 2 without going through another launcher screen 60.

In the title list screen 70, the title areas 71 are arranged based on the sequence in which the launcher screens 60 are switched by the first screen switching operation. In the title list screen 70, the smartphone 1 receives an operation of changing the sequence in which the title areas 71 are arranged. For example, when detecting a long tap on one of the title areas 71, the smartphone 1 makes the long-tapped title area 71 movable. When detecting dragging of the movable title area 71, the smartphone 1 changes the sequence in which the title areas 71 are arranged, according to the position where the dragged title area 71 is released. The sequence for switching the launcher screens 60 in response to the first screen switching operation is also changed in accordance with the arrangement sequence of the title areas 71.

The title list screen 70 is also provided with an Add area 72. When detecting the tap on the Add area 72, the smartphone 1 starts a process for adding a launcher screen 60.

Figure 9:
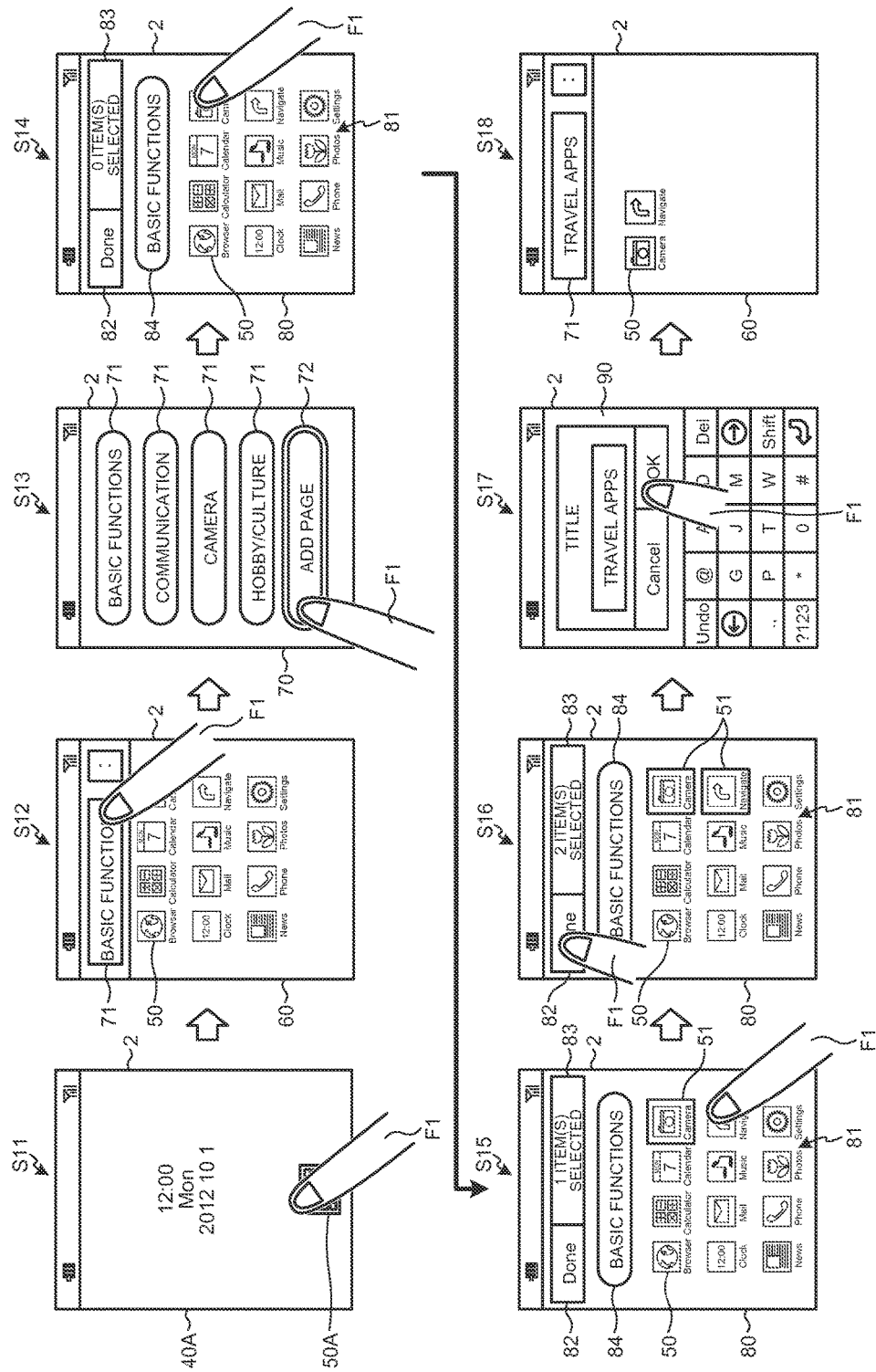
FIG. 9 is a schematic for explaining one of examples of how a launcher screen is added.

FIG. 9 is a schematic for explaining one of examples of how a launcher screen 60 is added. At Step S11, the smartphone 1 displays a home screen 40A on the touchscreen display 2. The home screen 40A has an icon 50A for causing the launcher screen 60 to be displayed on the touchscreen display 2. At Step S11, the user's finger F1 taps on the icon 50A.

When detecting a tap on the icon 50A, the smartphone 1 displays the launcher screen 60 on the display 2A (the touchscreen display 2), as illustrated at Step S12. In an example illustrated in FIG. 9, the smartphone 1 displays the launcher screen 60 with a title "Basic Functions" on the display 2A. The launcher screen 60 corresponding to the title "Basic Functions" has an arrangement of a plurality of icons 50. At Step S12, the user's finger F1 taps on the title area 71.

When detecting a tapping gesture on a title area 71, the smartphone 1 displays the title list screen 70 on the display 2A, as illustrated at Step S13. At Step S13, the user's finger F1 taps on the Add area 72.

When detecting the tap on the Add area 72, the smartphone 1 displays one of selection screens 80 on the display 2A, as illustrated at Step S14. The selection screen 80 is a screen for allowing a user to select icons 50 included in the launcher screen 60 to be added, from among the plurality of icons 50. The selection screens 80 are prepared correspondingly to the respective existing launcher screens 60. In this example, as illustrated in FIG. 8, because there are four existing launcher screens 60, four selection screens 80 are prepared. When detecting a tap on the Add area 72, the smartphone 1 displays the selection screen 80 corresponding to a launcher screen 60 having been displayed previously to the title list screen 70 on the display 2A.

The selection screen 80 includes an icon area 81, a Done area 82, a selection status area 83, and a title area 84. The icon area 81 is an area including the same arrangement of icons 50 as that in the corresponding launcher screen 60. The Done area 82 is an area allowing a user to indicate that selection of the icons 50 has been completed, in other words, a new launcher screen 60 including the selected icon 50 is to be created. The screen-adding operation in this example is an operation of tapping the Done area 82. The selection status area 83 is an area where the number of the selected icons 50 is displayed. The title area 84 is an area where the title assigned to the corresponding launcher screen 60 is displayed.

The smartphone 1 switches the selection screen 80 to be displayed in response to a screen switching operation. The screen switching operation for switching the selection screen 80 to be displayed is an operation that is the same as the first screen switching operation for switching the launcher screens 60, for example, a flick operation. When detecting a flick-to-left on the selection screen 80, for example, the smartphone 1 displays the next selection screen 80 in a predetermined sequence, and when detecting a flick-to-right on the selection screen 80, the smartphone 1 displays the previous selection screen 80. The predetermined sequence is the same as that in which the corresponding launcher screen 60 is switched according to the first screen switching operation.

In the manner described above, the selection screen 80 has the same icons 50 as those in the last displayed launcher screen 60 in the same arrangement as that in the last displayed launcher screen 60. The selection screen 80 to be displayed is switched by the same operation as that for the launcher screen 60, and each of the selection screens 80 has the same icons 50 as those in the corresponding launcher screens 60 in the same arrangement as that in the corresponding launcher screens 60. The user can therefore easily select icons 50 to be included in the new launcher screen 60 based on his/her memory of how the icons 50 have been arranged on the launcher screen 60 that the user generally uses.

At Step S14 in FIG. 9, the user's finger F1 taps on "Camera" icon 50. When detecting the tap on the "Camera" icon 50, the smartphone 1 reflects the selection result to the selection screen 80, as illustrated at Step S15. Specifically, the smartphone 1 represents the "Camera" icon 50 selected by the user as selected, and increments the number of selections in the selection status area 83.

At Step S15, the user's finger F1 taps on the "Navigate" icon 50. When detecting the tap on the "Navigate" icon 50, the smartphone 1 reflects the selection result to the selection screen 80, as illustrated at Step S16. Specifically, the smartphone 1 represents the "Navigate" icon 50 selected by the user as selected, and increments the number of selections in the selection status area 83.

At Step S16, the user's finger F1 taps on the Done area 82. When detecting the tap on the Done area 82 (the screen-adding operation), the smartphone 1 creates a new launcher screen 60 including the selected icons 50. Specifically, the smartphone 1 displays an input window 90 for entering a title on the display 2A, as illustrated at Step S17. When the title is entered in the input window 90, the smartphone 1 creates a launcher screen 60 assigned with the entered title, and places the arrangement of the selected icons 50 on the created launcher screen 60.

At Step S18 illustrated in FIG. 9, a new launcher screen 60 assigned with a title "Travel Apps" entered at Step S17 is displayed on the display 2A. In the displayed launcher screen 60, the "Camera" icon 50 selected at Step S15 and the "Navigate" icon 50 selected at Step S16 are arranged.

Figure 10:
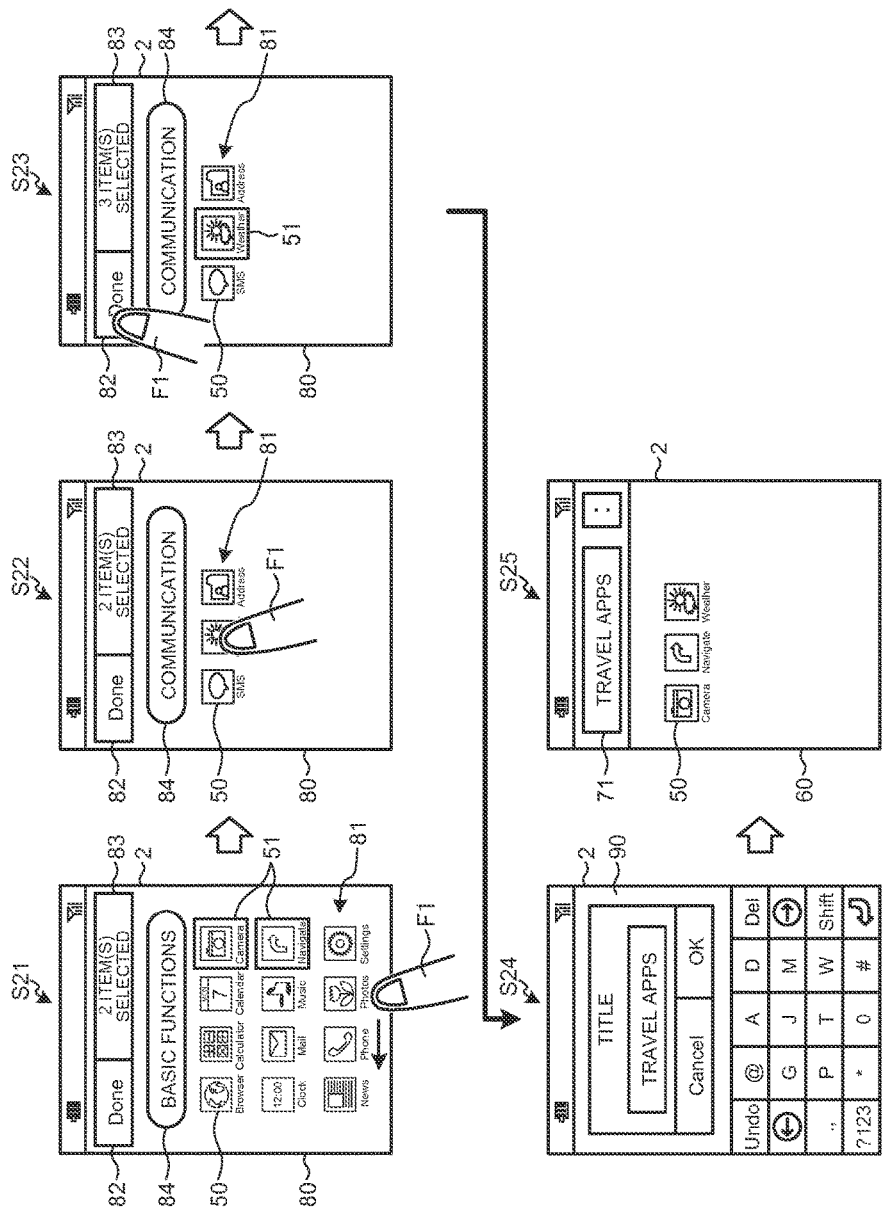
FIG. 10 is a schematic for explaining another one of examples of how the launcher screen is added.

FIG. 10 is a schematic for explaining another one of examples of how the launcher screen 60 is added. At Step S21 illustrated in FIG. 10, the smartphone 1 is at the same condition as that at Step S16 in FIG. 9. In other words, the smartphone 1 displays the selection screen 80 on the display 2A (the touchscreen display 2), and represents the "Camera" icon 50 and the "Navigate" icon 50 as selected.

At Step S21, the user's finger F1 flicks to left on the selection screen 80. When detecting the flick-to-left (screen switching operation) on the selection screen 80, the smartphone 1 switches the screen being displayed to the next selection screen 80, as illustrated at Step S22. At Step S22, the smartphone 1 displays a selection screen 80 corresponding to the launcher screen 60 assigned with the title "Communication". The selection screen 80 displayed at Step S22 has an arrangement of three icons 50, an "SMS" icon 50, a "Weather" icon 50, and an "Address" icon 50.

Even when the selection screen 80 being displayed is switched, the smartphone 1 maintains the selected icons 50 as selected. At Step S22, therefore, the "Camera" icon 50 and the "Navigate" icon 50, which are selected before the selection screen 80 is switched, remain selected, although these icons are not displayed in the touchscreen display 2.

At Step S22, the user's finger F1 taps on the "Weather" icon 50. When detecting the tap on the "Weather" icon 50, the smartphone 1 reflects the selection result to the selection screen 80, as illustrated at Step S23. Specifically, the smartphone 1 represents the "Weather" icon 50 selected by the user as selected, and increments the number of selections.

At Step S23, the user's finger F1 taps on the Done area 82. When detecting the tap on the Done area 82 (the screen-adding operation), the smartphone 1 creates a new launcher screen 60 including the selected icons 50. Specifically, the smartphone 1 displays the input window 90 for entering a title on the display 2A, as illustrated at Step S24. When the title is entered in the input window 90, the smartphone 1 creates a launcher screen 60 assigned with the entered title, and places the arrangement of the selected icons 50 on the created launcher screen 60.

At Step S25 illustrated in FIG. 10, a new launcher screen 60 assigned with a title "Travel Apps" input at Step S24 is displayed on the display 2A. The displayed launcher screen 60 has an arrangement of the "Camera" icon 50 and the "Navigate" icon 50 represented as selected at Step S21, and the "Weather" icon 50 selected at Step S23.

In the manner described above, the method for adding a screen according to an embodiment can also be used when added is any screen other than the home screen 40. The icons to be arranged in the new screen may be selected on a screen of other type than the new screen, as in some examples illustrated in FIGS. 9 and 10. In some examples illustrated in FIGS. 9 and 10, a user enters the title assigned to the launcher screen 60 when a new launcher screen 60 is created, but the user input of the title may be omitted. In such a case, a default value such as "new screen 1" may be assigned to a new launcher screen 60, and the user may change the title, as required, after the new launcher screen 60 is created.

The launcher screen 60 and the selection screen 80 illustrated in FIGS. 7 to 10 are exemplary, and the forms and the arrangement of various elements, the number of screens, and how the various operation are performed on the screen need not be the same as those described above.

Figure 11:
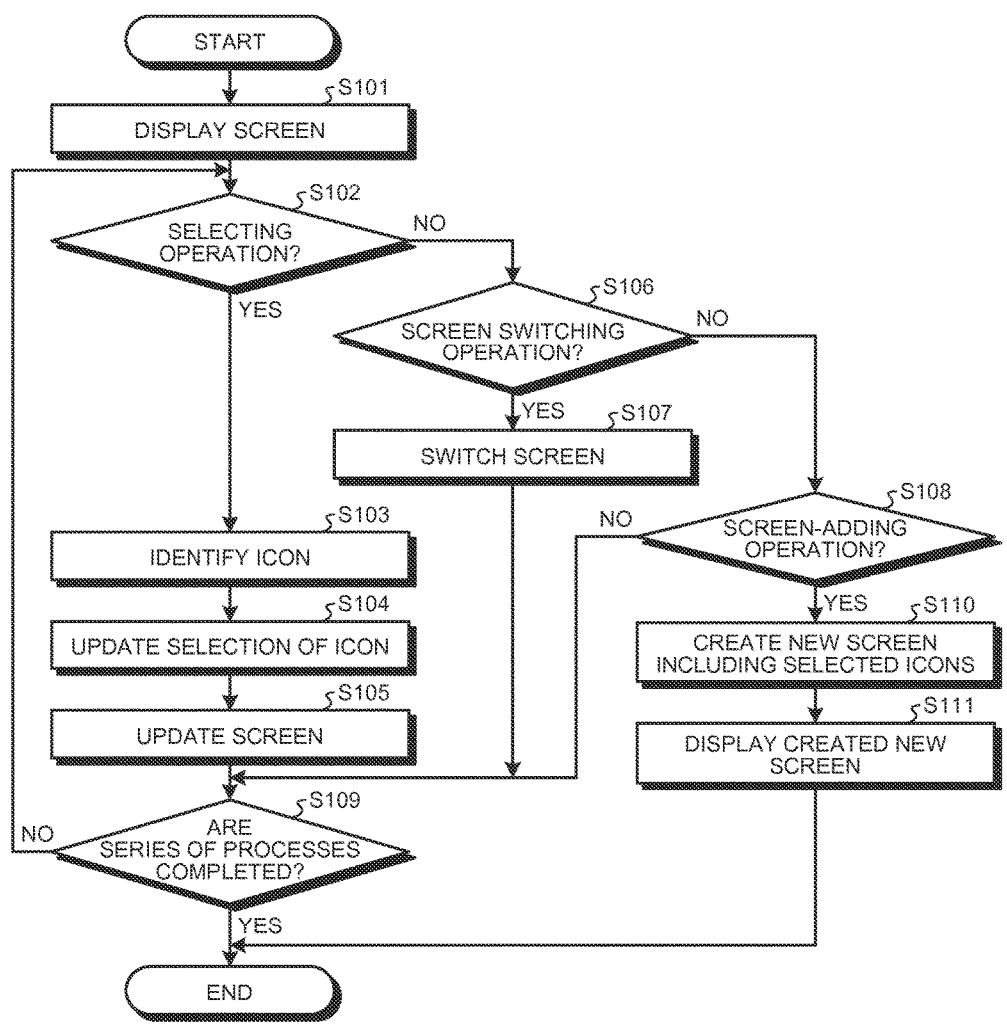
FIG. 11 is a flowchart illustrating a process in which a controller in the smartphone creates a new screen.

The process in which the smartphone 1 creates a new screen will now be explained with reference to FIG. 11. FIG. 11 is a flowchart illustrating the process in which the controller 10 in the smartphone 1 creates a new screen. The process illustrated in FIG. 11 is executed by the controller 10 executing the control program 9A.

As illustrated in FIG. 11, the controller 10 displays a screen for selecting icons, at Step S101. The screen shown at Step S101 is the home screen 40 transited to the icon-selected mode at Step S2 in FIG. 5, or the selection screen 80 at Step S14 in FIG. 9, for example.

At Step S102, the controller 10 determines whether a selecting operation is detected. The selecting operation is an operation of selecting an icon. The selecting operation is a tap on an icon, for example. When detecting the selecting operation (Yes at Step S102), the controller 10 proceeds to Step S103. At Step S103, the controller 10 identifies the icon on which the selecting operation is performed. At Step S104, the controller 10 updates the selection of the icon on which the selecting operation is performed, and updates the screen based on the updated selection at Step S105.

The controller 10 then proceeds to Step S109. At Step S109, the controller 10 determines whether the series of processes are completed. The controller 10 determines that the series of processes are completed when a user operation cancelling the addition of a screen is detected, for example. When the series of processes are completed (Yes at Step S109), the controller 10 ends the process illustrated in FIG. 11. When the series of processes are not completed yet (No at Step S109), the controller 10 returns to Step S102.

When the selecting operation is not detected (No at Step S102), then at Step S106, the controller 10 determines whether a screen switching operation is detected. The screen switching operation is an operation for changing the displayed screen to another screen of the same type. The screen switching operation is, for example, a flick on the screen. When detecting a screen switching operation (Yes at Step S106), the controller 10 proceeds to Step S107. At Step S107, the controller 10 switches the screen being displayed. The controller 10 then proceeds to Step S109.

When the screen switching operation is not detected (No at Step S106), at Step S108, the controller 10 determines whether a screen-adding operation is detected. The screen-adding operation is an operation giving an instruction to create a new screen. The screen-adding operation is, for example, a tap on a certain button. When the screen-adding operation is not detected (No at Step S108), the controller 10 proceeds to Step S109. When detecting the screen-adding operation (Yes at Step S108), the controller 10 proceeds to Step S110.

At Step S110, the controller 10 creates a new screen including the selected icons. At Step S111, the controller 10 displays the created screen on the touchscreen display 2. When the new screen is created, the controller 10 ends the process illustrated in FIG. 11.

Some embodiments disclosed herein may be modified to the extent that the gist and the scope of the present invention are not impaired. Some embodiments disclosed herein and modifications thereof may be combined as appropriate. For example, some embodiments can be modified as described below.

For example, each of the computer programs illustrated in FIG. 6 may be divided into a plurality of modules, or may be coupled with another computer program.

Explained in some embodiment described above is one of examples in which icons are arranged on a screen, but the objects arranged on the screen are not limited to icons. Various types of objects such as widgets and sticky notes may be arranged on the screen. The smartphone 1 may then newly create a screen including the selected objects when an instruction for creating a new screen is received while the objects are selected.

In some embodiment described above, a smartphone is used as one of examples of the electronic device, but the apparatus according to the appended claims is not limited to smartphones. The apparatus according to the appended claims may be any mobile electronic device other than a smartphone. Examples of the mobile electronic device include, but are not limited to, mobile telephones, tablets, mobile personal computers, digital cameras, media players, electronic book readers, navigators, game machines, etc. The apparatus according to the appended claims may be an immobile electronic device. Examples of an immobile electronic device include, but are not limited to, desktop personal computers, automatic teller machines (ATM), television receivers, etc.

Explained in some embodiment described above is one of examples in which the electronic device detects gestures via the touchscreen 2B, but the electronic device may not be provided with the touchscreen 2B. The electronic device may be configured to detect a user operation via various types of an input apparatus such as a mouse or a touch pad. Alternatively, the electronic device may be configured to include both of the touchscreen 2B and the various types of an input apparatus such as a mouse or a touch pad.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An electronic device, comprising:
   a display configured to display a first screen, as an icon-selection home screen, including one or more first icons, each of the first icons corresponding to one of applications; and
   a controller configured to
   select one of the first icons as a first selected icon in response to a tap on said one of the first icons in the first screen, and
   add a new screen, as a new home screen, including the first selected icon in response to a tap on an add button on the first screen after selecting the first selected icon,
   wherein
   when a second screen, as an existing home screen, including the first icons is displayed, the controller is configured to, in response to a single predetermined operation on one of the first icons in the second screen,
   change the second screen to the first screen,
   arrange the first icons of the second screen on the first screen in a same arrangement as that in the second screen, and
   cause the display to display, in the first screen, the one of the first icons being operated on by the single predetermined operation, as a selected icon to be added to the new screen,
   the first screen is one of screens,
   the controller is configured to change the first screen to another screen of the screens in a switching manner in response to a screen switching operation, and
   the first screen is the icon-selection home screen that is the second screen being in an icon-selected mode.

2. The electronic device according to claim 1, wherein the controller is configured to, in response to the tap on said one of the first icons in the first screen,
   set the first selected icon to any one of a first selected mode and a second selected mode depending on at least one of a type and a duration of the tap on said one of the first icons, and
   in the first selected mode and upon adding the new screen, add the first selected icon to the new screen and delete the first selected icon from the first screen, and
   in the second selected mode and upon adding the new screen, add the first selected icon to the new screen without deleting the first selected icon from the first screen.

3. The electronic device according to claim 1, wherein the screens further include a third screen including one or more second icons,
   each of the second icons is corresponding to one of further applications, and
   the controller is configured to
   select one of the second icons as a second selected icon in response to a further tap on said one of the second icons in the third screen, and
   add the new screen including the first selected icon and the second selected icon in response to a tap on the add button on one of the first and third screens after selecting the first selected icon and the second selected icon.

4. The electronic device according to claim 1, wherein the controller is configured to select, without moving, said one of the first icons as the first selected icon in response to the tap on said one of the first icons in the first screen.

5. The electronic device according to claim 4, wherein the controller is configured to perform simultaneously, in response to the tap on the add button, both the addition of the new screen and the arrangement of the first selected icon on the new screen.

6. The electronic device according to claim 1, wherein, in the icon-selected mode,
   the controller is configured to, in response to the screen switching operation after selection of the first selected icon, switch the icon-selection home screen to another icon-selection home screen, and keep the first selected icon in a selected state after having switched the icon-selection home screen to said another icon-selection home screen.

7. A control method for an electronic device with a display, the control method comprising:

displaying a first screen, as an icon-selection home screen, including one or more first icons, each of the first icons corresponding to one of applications;

selecting one of the first icons as a first selected icon in response to a tap on said one of the first icons in the first screen;

adding a new screen, as a new home screen, including the first selected icon in response to a tap on an add button on the first screen after selecting the first selected icon; and when a second screen, as an existing home screen, including the first icons is displayed and in response to a single predetermined operation on one of the first icons in the second screen, changing the second screen to the first screen, arranging the first icons of the second screen on the first screen in a same arrangement as that in the second screen, and causing the display to display, in the first screen, the one of the first icons being operated on by the single predetermined operation, as a selected icon to be added to the new screen, wherein the first screen is one of screens, the control method further comprises changing the first screen to another screen of the screens in a switching manner in response to a screen switching operation, and the first screen is the icon-selection home screen that is the second screen being in an icon-selected mode.

8. A non-transitory storage medium that stores a control program for causing, when executed by an electronic device with a display, the electronic device to execute a process comprising:

displaying a first screen, as an icon-selection home screen, including one or more first icons, each of the first icons corresponding to one of applications;

selecting one of the first icons as a first selected icon in response to a tap on said one of the first icons in the first screen;

adding a new screen, as a new home screen, including the first selected icon in response to a tap on an add button on the first screen after selecting the first selected icon; and when a second screen, as an existing home screen, including the first icons is displayed and in response to a single predetermined operation on one of the first icons in the second screen, changing the second screen to the first screen, arranging the first icons of the second screen on the first screen in a same arrangement as that in the second screen, and causing the display to display, in the first screen, the one of the first icons being operated on by the single predetermined operation, as a selected icon to be added to the new screen, wherein the first screen is one of screens, the process further comprises changing the first screen to another screen of the screens in a switching manner in response to a screen switching operation, and the first screen is the icon-selection home screen that is the second screen being in an icon-selected mode.

\* \* \* \* \*